(12) United States Patent
Robertson

(10) Patent No.: US 9,702,477 B1
(45) Date of Patent: Jul. 11, 2017

(54) POWER VERSATILE AND ENERGY EFFICIENT ELECTRIC COAXIAL VALVE

(71) Applicant: Glen A. Robertson, Madison, AL (US)

(72) Inventor: Glen A. Robertson, Madison, AL (US)

(*) Notice: Subject to any disclaimer, the term of this patent is extended or adjusted under 35 U.S.C. 154(b) by 0 days.

(21) Appl. No.: 14/972,518

(22) Filed: Dec. 17, 2015

(51) Int. Cl.
- *F16K 31/08* (2006.01)
- *F16K 1/12* (2006.01)
- *F16K 31/06* (2006.01)
- *H01F 7/16* (2006.01)
- *H01F 7/122* (2006.01)

(52) U.S. Cl.
CPC ............ *F16K 31/082* (2013.01); *F16K 1/123* (2013.01); *F16K 31/0606* (2013.01); *H01F 7/122* (2013.01); *H01F 7/1615* (2013.01)

(58) Field of Classification Search
CPC ...... F16K 31/08; F16K 31/082; F16K 31/084; F16K 1/123; F16K 31/0606; F16K 31/0651; H01F 7/1615; H01F 7/122
USPC ................. 251/65, 84–85, 129.21, 325, 337; 335/229
See application file for complete search history.

(56) References Cited

U.S. PATENT DOCUMENTS

| | | | |
|---|---|---|---|
| 2,279,243 A * | 4/1942 | Parsons | F16K 31/0651 251/129.21 |
| 3,007,672 A * | 11/1961 | Tischler | F16K 31/0651 251/129.21 |
| 3,125,321 A * | 3/1964 | Van Domelen | F16K 31/0651 251/129.21 |
| 3,321,177 A * | 5/1967 | Fendel | F16K 31/0651 251/129.21 |
| 3,502,105 A * | 3/1970 | Ernyei | F15B 13/0405 137/554 |
| 4,829,947 A * | 5/1989 | Lequesne | F01L 9/04 123/90.11 |
| 4,988,074 A * | 1/1991 | Najmolhoda | G05D 16/2013 251/129.08 |
| 5,144,982 A * | 9/1992 | Willbanks | H01F 7/1646 137/625.5 |
| 5,351,934 A * | 10/1994 | Jensen | F16K 1/123 251/65 |
| 5,375,811 A * | 12/1994 | Reinicke | F16K 31/082 137/550 |
| 5,529,281 A * | 6/1996 | Brudnicki | F16K 1/123 251/129.21 |
| 6,068,010 A * | 5/2000 | Reinicke | F16K 31/0651 251/129.21 |
| 6,899,314 B2 * | 5/2005 | Ott | F16K 31/0606 251/129.14 |

(Continued)

*Primary Examiner* — John Bastianelli

(57) ABSTRACT

A power versatile and energy efficient electric coaxial valve is a dual magnetic latching electric tube-type valve having an electrically pulsed actuated permanent electromagnet with an armature having three active poles to increase the magnetic force of the armature provided by permanent magnets for energy efficiency. The electric coaxial valve is augmented with a balanced spring means that works in concert with the armature to increase the internal force and tube movement distance, while reducing the energy needed to operate the valve. The increased magnetic force, internal force, and tube movement distance provide a coaxial valve that can have increased pressure or flow area. The valve is power versatile in that the pulsed electric means used to operate the valve is power versatile.

9 Claims, 9 Drawing Sheets

(56) References Cited

U.S. PATENT DOCUMENTS

| | | | |
|---|---|---|---|
| 7,007,917 B2* | 3/2006 | Choi | F16K 31/082 251/122 |
| 2010/0163766 A1* | 7/2010 | Alvarez | F16K 31/0658 251/65 |
| 2014/0239209 A1* | 8/2014 | Bandini | B67C 3/286 251/65 |

* cited by examiner

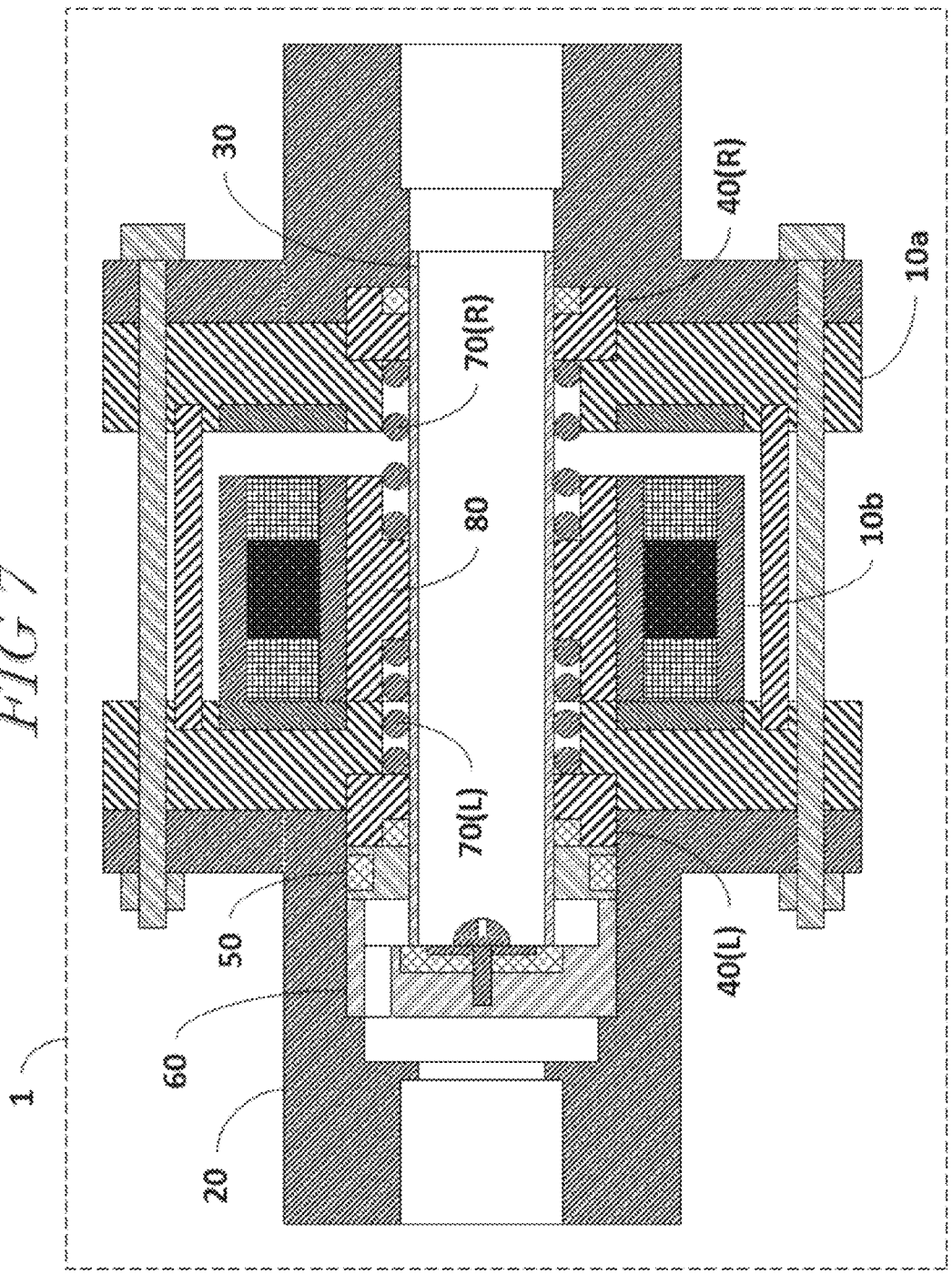

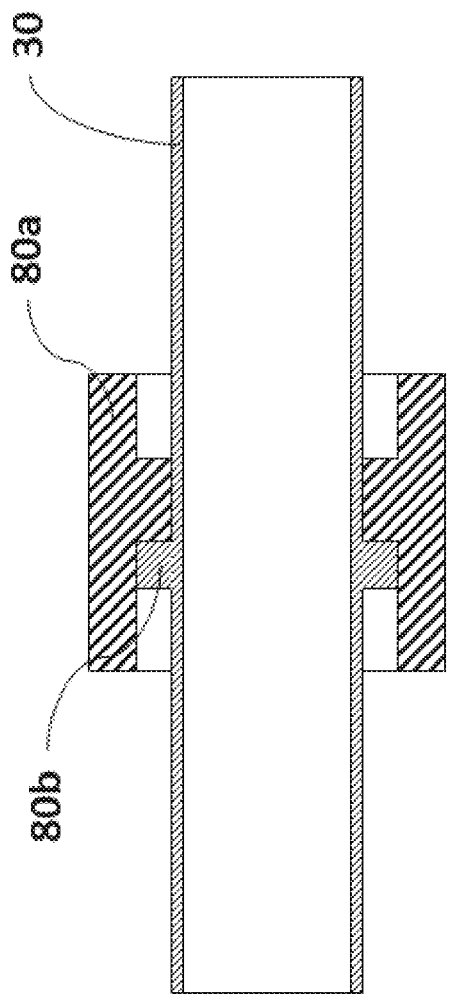

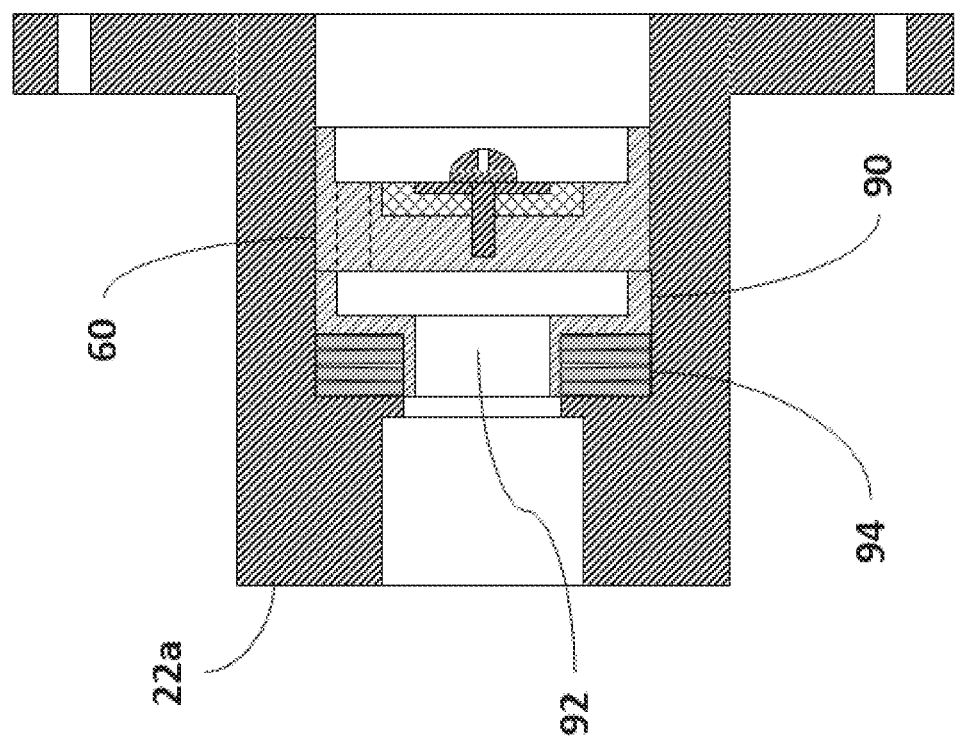

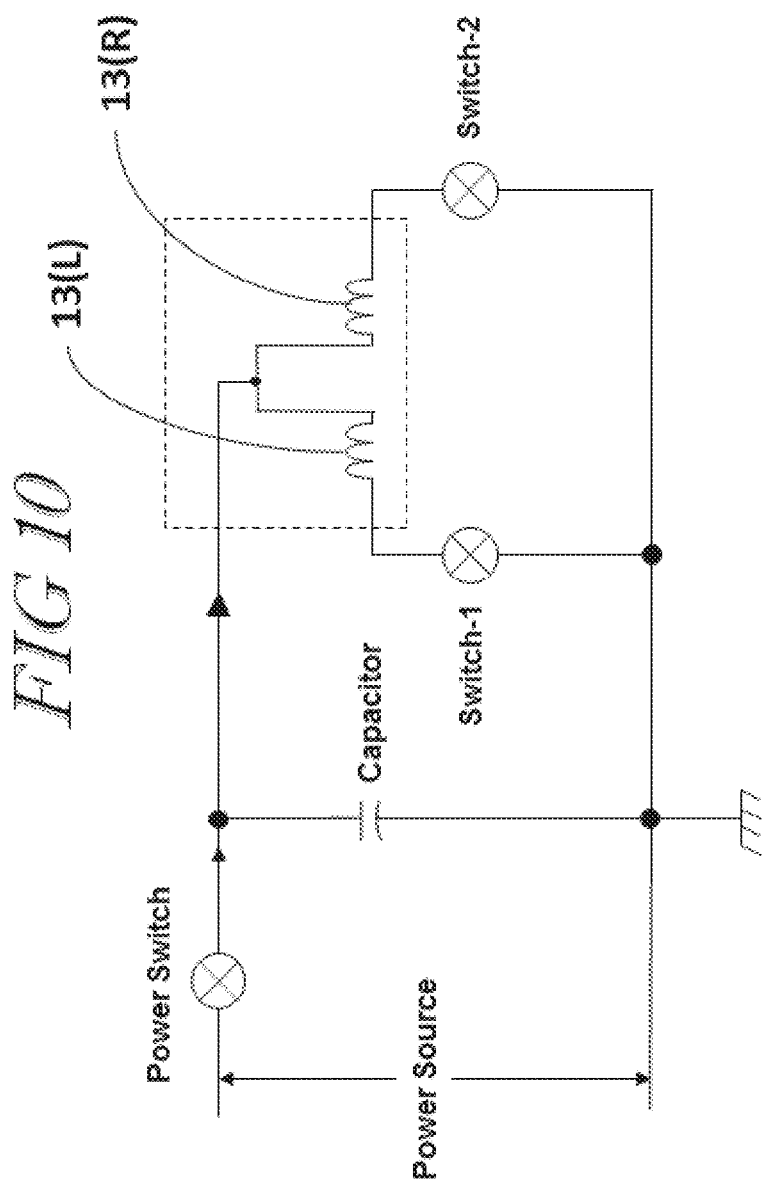

POWER VERSATILE AND ENERGY EFFICIENT ELECTRIC COAXIAL VALVE

BACKGROUND OF THE INVENTION

1. Field of the Invention

This invention relates generally to the field of high pressure and increased flow valves and more specifically to an electric tube-type valve, referred to in this specification as an electric coaxial valve, which includes a permanent electromagnet with an armature having three active poles to increase the magnetic force from a permanent magnet, can be operable by pulse current means that provides a brief continuous or pulse electric current for energy efficiency and power versatility, and can be augmented with a balanced spring means for further energy efficiency that works in concert with the magnetic force from the permanent magnet for increased internal force on the tube and increased movement distance of the tube. The electric coaxial valve is dual latching in that it holds its position when not operable by use of the magnetic force from the permanent magnet.

2. Description of Related Art

While the use of tube-type or coaxial valves of various types are well known, to include electromagnetic coaxial valves utilizing a permanent electromagnets having a permanent magnet to magnetically latch the tube and which may be electrically or manually actuated, no such coaxial valve is known to utilize a permanent electromagnet with an armature having three active poles for increase magnetic force, to be pulsed operable by a pulse current means for energy efficiency and power versatility, or to be force augmented by a balanced spring means for increase movement distance and further energy efficiency.

a. Coaxial Valves

In the art of coaxial valves, the highest force for moving the tube is against the pressure of a gas or fluid medium during moving the tube against a valve seat to close flow as the pressure aids in opening the tube to permit flow.

Tube designs and force mechanism have been developed to minimize the force on the tube. In general and without such force reducing means and neglecting seal and other resistances; the pressure P of the medium through the valve times the tube wall cross-sectional area $A_w = T_h \times 2\pi r_{tube}$, where $T_h$ is the tube wall thickness and $r_{tube}$ is the medium tube radius, determines the force $F = P \times A_w$ on the tube; the tube movement distance d times the cross-sectional flow area circumference $C = 2\pi r$ inside the tube equals the cross-sectional flow area $A_f = \pi r^2 = \frac{1}{2} r \times C = d \times C$ through the tube, where r is the radius of the cross-sectional flow area $A_f$—implying that the distance $d = \frac{1}{2} r$ and $A_f = 4\pi d^2$, whereby the force F on the tube times the distance d moved by the tube is equal the energy $E = F \times d$ required to move the tube. Noting that the total tube cross-sectional area $A_T = A_f + A_w = \pi r_{tube}^2$. That is, the relationships of these parameters give the energy $E \sim P \times T_h \times A_f \times (1 + T_h/r)$.

Given that the tube wall thickness $T_h \ll r$, the energy needed to move the tube $E > P \times T_h \times A_f$. Whereby letting the tube wall thickness $T_h$ remain constant with pressure P by assuming that materials can be found to compensate for increase pressure, the relationship of these equations tell us that for increased pressure P or increased flow area $A_f$, the energy E increases.

In typical coaxial valves, the energy E needed to provide the force to move the tube is always taken to be less than or equal to the applied external energy $\xi$ unless some internal energy means is utilized. That is, in coaxial valves increasing the energy E needed to move the tube increases the applied external energy $\xi$.

b. Permanent Electromagnetic Coaxial Valves

To reduce the external energy required to operate coaxial valves, permanent electromagnetic—electromagnetics containing one or more permanent magnets—have been used. Permanent electromagnetic come in many types. In this specification, permanent electromagnetic referrers to permanent electromagnetics that have a bi-stable magnetic circuit in the poles about two coils, referred to as the electromagnetic means, with a permanent magnet between the coils and the poles, and having the coils wound in a manner to match the applied current to cause the magnetic flux from the permanent magnet to be directed in a bi-directional manner about the electromagnetic means. The permanent magnet providing a dual latching function to latch the tube in the coaxial valve in an open or closed position. Such bi-stable electromagnetic means are typical to the Dual Position Latching Solenoid of U.S. Pat. No. 3,022,450 by Chase in 1962.

Example permanent electromagnetic coaxial valves with a bi-stable electromagnetic means are Jensen (U.S. Pat. No. 5,351,934) and Brudnicki (U.S. Pat. No. 5,529,281), both having two active poles—one moveable and alternating pole on the armature and one stationary and alternating pole attached to the valve housing. In Jensen the permanent magnet does not move with the armature, whereas in Brudnicki the permanent magnet is attached to the armature—moving with it. The electromagnetic principle of motion of the armature is the same, i.e. the magnetic attraction is between the two poles with the two poles alternating sides of the armature, as the armature moves the tube in the coaxial valve to a close or open position.

The difference in the permanent magnet movement is due to the addition of a lever to Brudnicki, which is only a method to manually disengage the armature from a magnetic latched position. The lever has no function to the electrical operability of the valve, but is a means to operate the valve in an electrical energy saving mode by applied mechanical energy from a secondary external energy source. That is, no internal energy is gained by adding the lever, in fact, the lever could increase the electrical energy through added resistance when the armature moves as the lever must also move.

In the art of permanent electromagnetic coaxial valves as those of Jensen and Brudnicki most of the energy needed to move the tube comes from the magnetic force provided by the magnetic flux from the permanent magnet with respect to the pole area on the armature with an external electrical energy source provide to magnet coils to reverse the magnetic flux in the armature. The relationship between the reversal of the magnetic flux and the external electrical energy is a bit complex to discuss here. Although, it can be shown that the external electrical energy increases with the magnetic latching force between the pole on the armature and the stationary pole affixed to the valve housing when abutted.

In the art of magnetic attraction, the force of attraction between two magnetic poles is directly proportional to the product of the strengths of the poles and inversely proportional to the square of the distance between them.

In permanent electromagnets, the strengths of the poles is proportional to the magnetic flux from the permanent magnet at the pole on the armature per the area of the pole on the armature and the distance between poles is the gap distance between the pole on the armature and the stationary pole on the housing. Given the gap distance is the movement distance d of the tube, the magnetic force to move the tube must occur at the initial start of movement of the tube or the gap distance d. Since the magnetic force changes as $1/d^2$, the magnetic latching force will be much-much greater than the force needed to move theutbe. Therefore, small increases in the force needed to move the tube in permanent electromagnetic coaxial valves will greatly increase the magnetic latching force, which will greatly increase the external electrical energy.

c. Powering Permanent Electromagnet

The external energy for permanent electromagnets is an electrical source, where the external energy $\xi=VC$ and where V is the applied voltage and C is the total charge flow through the electromagnetic means. As the magnetic latching force increases it can be shown that the time $t_r$ needed to reverse the magnetic flux also increases. Further, the external energy $\xi$ needs to be applied over the time $t_d$ the tube moves the distance d. Whereby, the total applied external energy time $t=t_r+t_d$ dictates the electrical power $W=\xi/t=V/t=VI$, where I is the current to the electromagnetic means.

In the art of continuous electrical power systems, the size of the power system grows with the value of the power VI. Whereby, the size of an electrical power system for permanent electromagnetic coaxial valves using continuous currents even if applied briefly will grow with increased pressure P and flow area $A_f$.

SUMMARY OF THE INVENTION

The present invention is directed toward providing pressure and flow area improvements over electric coaxial valves like those of Jensen (U.S. Pat. No. 5,351,934) and Brudnicki (U.S. Pat. No. 5,529,281), having a single pole on the armature, with respect to the applied energy. The improvements are directed toward increases in the magnetic force, internal force, and tube movement distance. Increased magnetic force and internal force is directly related to producing electric coaxial valves with increased pressure, and increased magnetic force and internal force with increased tube movement distance is directly related to producing electric coaxial valves with increased flow area.

Increase magnetic force and tube movement distance inherently increases the power requirement as the magnetic latching force is increased. Because the movement time of the tube is short, and to levitate the need for a large power supply, a pulse current means can be used. Therefore, a pulse current means for operating the present invention in an energy efficient and power versatile manner is also presented.

For increased magnetic force, the present invention utilizes the permanent electromagnet of US Pub. 2012/0175974 A1, which has an armature with two poles, which effectively doubles the magnetic force over the single pole armatures in the electric coaxial valves of Jensen (U.S. Pat. No. 5,351,934) and Brudnicki (U.S. Pat. No. 5,529,281) with same size and type permanent magnet.

For increased internal force, the present invention utilizes a balanced spring means comprising two springs, wherein during assembly of the present invention more compression energy is added to one spring over the other spring. This added compression energy is not removed from the present invention by the operation of the valve, but transferred in concert with the armature from one spring to the other spring during the operation of the valve. This additional energy is converted to a spring compression force which increases the internal force of the electric coaxial valve, while providing additional internal energy that lowers the energy needed by the present invention to move the armature and tube.

For increased tube movement distance, the balance spring means works in concert with the magnetic force provided by the magnetic flux in the present invention. In the present invention, most of the force on the tube at gap distance is not from the magnetic force as in the electric coaxial valves of Jensen (U.S. Pat. No. 5,351,934) and Brudnicki (U.S. Pat. No. 5,529,281), but from the compression force in the springs. Effectively, the balance spring means removes the $1/d^2$ reduction of the magnetic force. This is accomplished by allowing the spring compression force at the gap distance d to be near the magnetic latching force, which for large tube gap distances will be extremely high. The magnetic latching force must be a bit greater than the maximum spring force to insure that the armature will remain magnetically latched against the spring compression force or other forces the valve may experience. The spring compression force will decrease linearly while the magnetic force increases as $1/d^2$ such that the minimum force on the tube over the movement distance d will be higher than without the balance spring means.

The increased magnetic latching force and increased tube movement distance, lends the present invention to a pulse current means that can provide high pulsed power. For the present invention, a pulse current means like U.S. Pat. No. 9,343,216 B2 by Robertson is employed. The U.S. Pat. No. 9,343,216 B2 was actually designed for bi-stable permanent magnet actuators for energy efficiency and power versatility, and has the capability to provide high pulsed power over the short movement times needed by the present invention.

The implementation of a permanent electro magnet into a coaxial valve fixes the tube movement distance to that of the armature movement distance. This can be troublesome for valve seat materials that permanently deform from the magnetic latching force transferred to the tube against the valve seat. The magnetic latching force can be very high compared to the actual force needed for sealing, which would impose a high calibration of the valve seal placement to insure the valve seat does not experience the high magnetic latching force. To alleviate the need for high calibration of the valve seal placement, a moveable valve seat may be employed to lower the force on the valve seat. One means for allowing the valve seat to move is presented.

BRIEF DESCRIPTION OF THE DRAWINGS

For a better understanding of the present invention, references are made to the accompanying drawings in which:

FIG. 6 shows views of the prospective valve se at in FIG. 1.

FIG. 7 shows a cross-sectional view of a prospective alternate electric coaxial valve of FIG. 1 containing a balance spring means in accordance to the present invention.

FIG. 8 shows a cross-sectional view of an alternative design for the force member in FIG. 7.

FIG. 9 shows a cross-sectional view of one prospective means for allowing movement of the valve seat of FIG. 1 or 7.

FIG. 10 shows an illustration of one version of a pulse current means for providing a pulse currents to the present invention.

DETAILED DESCRIPTION OF THE DRAWINGS

Figure 1:
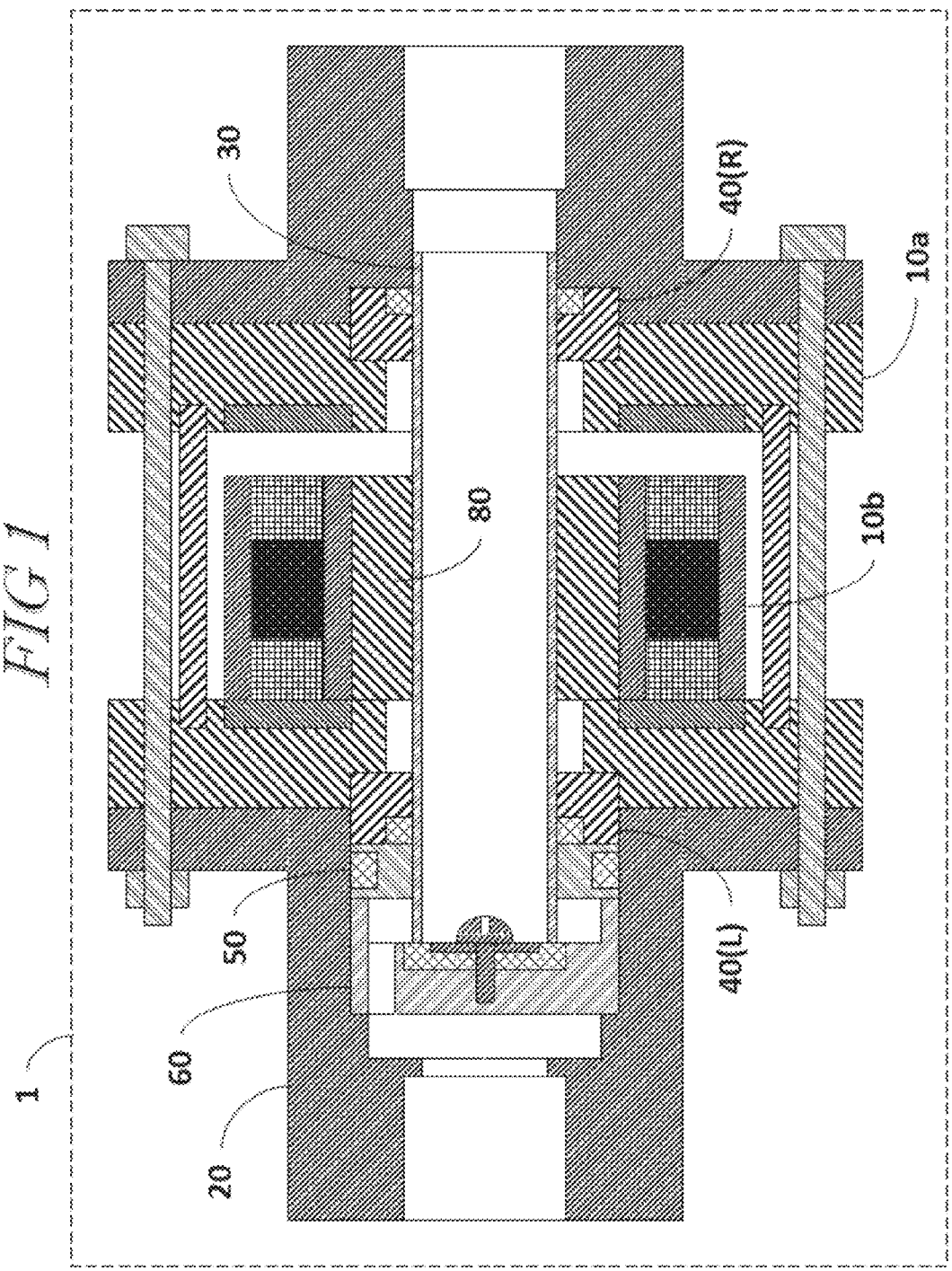
FIG. 1 shows a cross-sectional view of a prospective electric coaxial valve in accordance to the present invention.

Referring to the drawings, FIG. 1 shows the electric coaxial valve 1 of the present invention comprising a permanent electromagnet 10 with stationary portion 10a and armature 10b, housing 20, tube 30, tube seals 40(L-R), housing seal 50, and valve seat 60, and force member 80 firmly attached to the armature 10b and tube 30. In FIG. 1, the armature 10b is magnetically latched to the left side of the stationary portion 10a with a first gap between the armature 10b and the right side of the stationary portion 10a with the tube 30 abutted to the valve seat 60 to close the valve. The opposite is true, so that, when the armature 10b is magnetically latched to the right side of the stationary portion 10a, the tube 30 would be off the valve seat 60 with a second gap between the armature 10b and the left side of the stationary portion 10a to open the valve.

Figure 2:
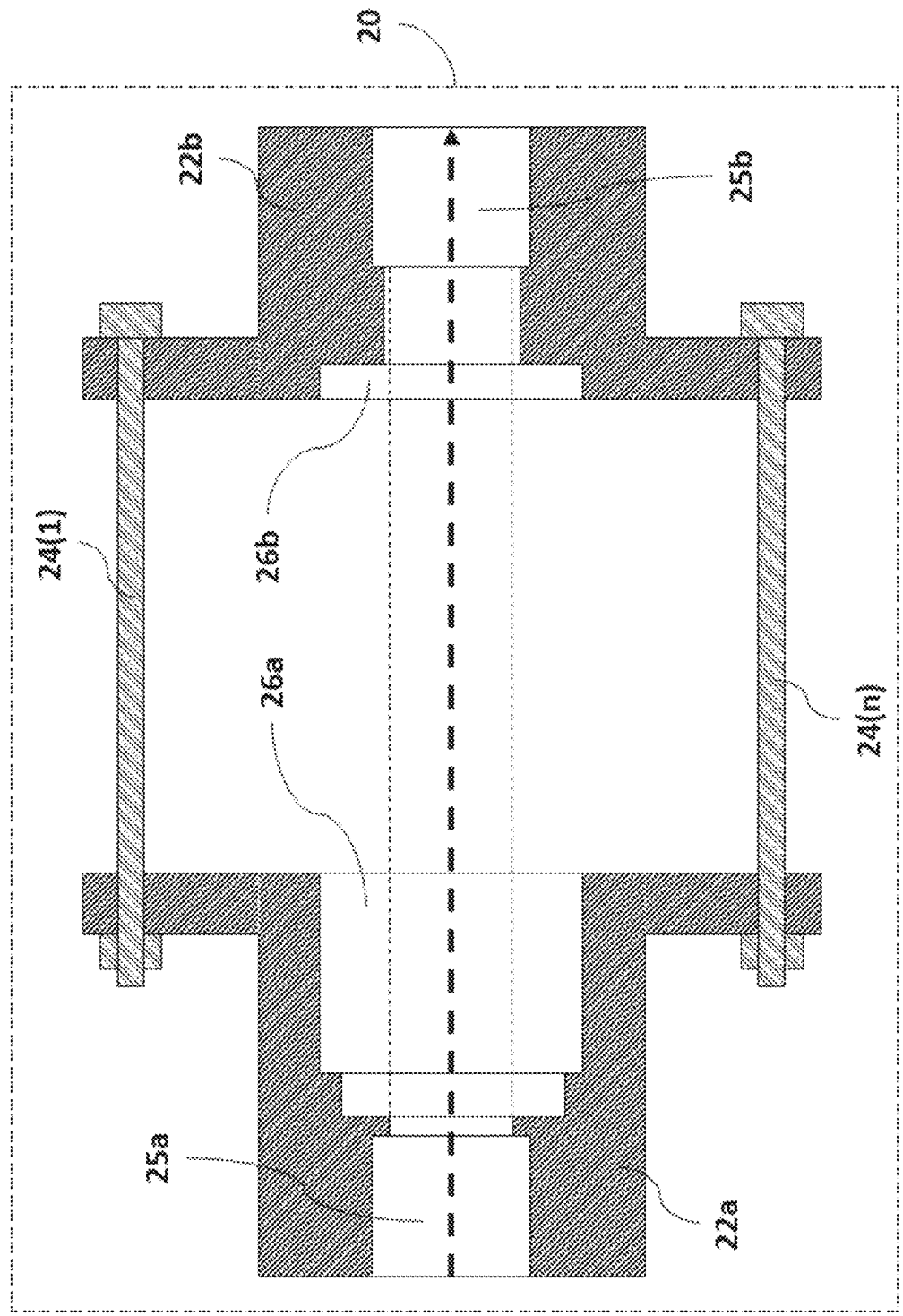
FIG. 2 shows a cross-sectional view of one prospective housing of the present invention of FIG. 1.

FIG. 2 shows a cross-sectional view of the prospective housing 20 of the electric coaxial valve 1 in FIG. 1. The housing 20, with respect to FIG. 1, comprises two connection bodies 22a-b for allowing flow in through chamber 25a and out through chamber 25b, where chamber 25a allows for placement of the valve tube seal 40(L), the housing seal 50, and valve seat 60, and where chamber 25b allows for placement of the valve tube seal 40(R). In FIG. 2, the flow duct is indication by the light dotted lines connecting chambers 25a-b, and the flow across the flow duct housing 20 is indicated by the dark dashed arrow. The connectors 24(1-n) firming assembly the permanent electromagnet 10, tube 30, tube seals 40(L-R), housing seal 50, valve seat 60, force member 80 as shown in FIG. 1, within the housing 20.

It is understood that the connectors 24 can be of various methods used in the art of connecting things. In FIG. 2, the example connectors 24 are comprised of nuts and bolts 24(1-n), where n indicates the number of bolts used.

It is understood that the force member 80 must be firmly attached to the armature 10b and tube 30 by any means appropriate to provide simultaneous movement of the armature 10b and tube 30 and that the force member 80 could be an integral part of the armature 10b or tube 30.

It is also understood that the first and second gap between the armature 10b and the stationary portion 10a is the movement distance of the armature 10b and tube 30.

Figure 3:
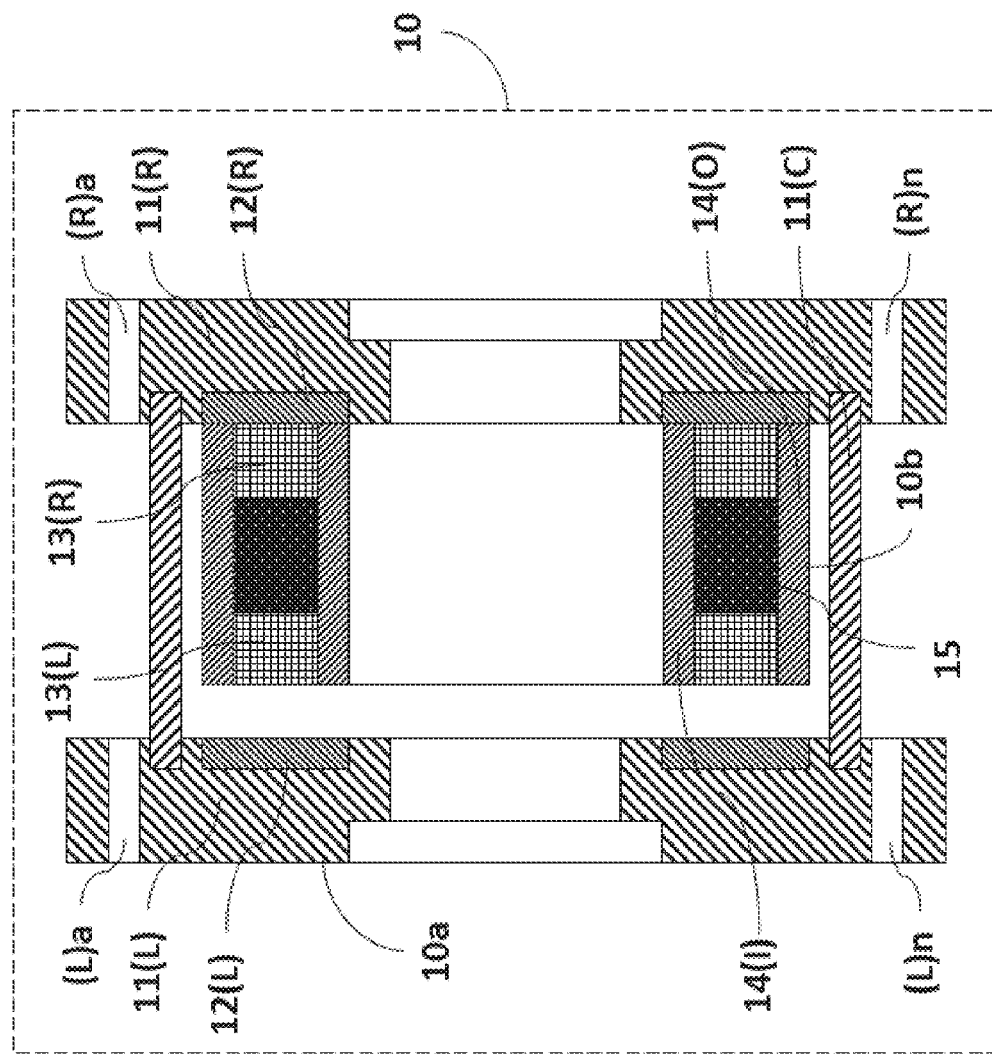
FIG. 3 shows a cross-sectional view of a prospective permanent electromagnet for controlling the axial movement of the valve tube in FIG. 1.

In FIG. 3, the permanent electromagnet 10 is similar to the dual position latching solenoid of US Pub. 2012/0175974 A1, comprising a stationary portion 10a composed of end plates 11(L-R), cover 11(C), and third and fourth poles 12(L-R); and an armature portion 10b that can move between the third and fourth poles 12(L-R) composed of first and second poles 14(I-O), a bi-stable electromagnetic means comprising coils 13(L-R) between the first and second poles 14(I-O), and a permanent magnet 15 between the coils 13(L-R) and first and second poles 14(I-O).

In FIG. 3, the third and fourth poles 12(L-R) are firmly embedded in the structures 11(L-R) in a manner that prevents the third and fourth poles 12(L-R) from being displaced by the attraction of the first and second poles 14(I-O). The structures 11(L-R) are preferred non-magnetic to insure the highest magnetic force between the third and fourth poles 12(L-R) and first and second poles 14(I-O). The cover 11(C) between the structures 11(L-R) provides the gap distance between the third and fourth pole 12(L) or 12(R) and the first and second poles 14(I-O), and provides a platform to attach a power connector (not shown) for passing electrical power to the coils 13(L-R) through the cover 11(C).

In FIG. 3, the passages (L)a-n and (R)a-n are for the passage of the bolts of the connectors 24(1-n) as illustrated in FIG. 2. It is understood that the housing 20 of FIG. 2 could be designed with a different connection method, whereby the passages (L)a-n and (R)a-n would not be needed and the shaped of the end plates 11(L-R) and cover 11(C) modified to accommodate the connection method used.

Figure 4:
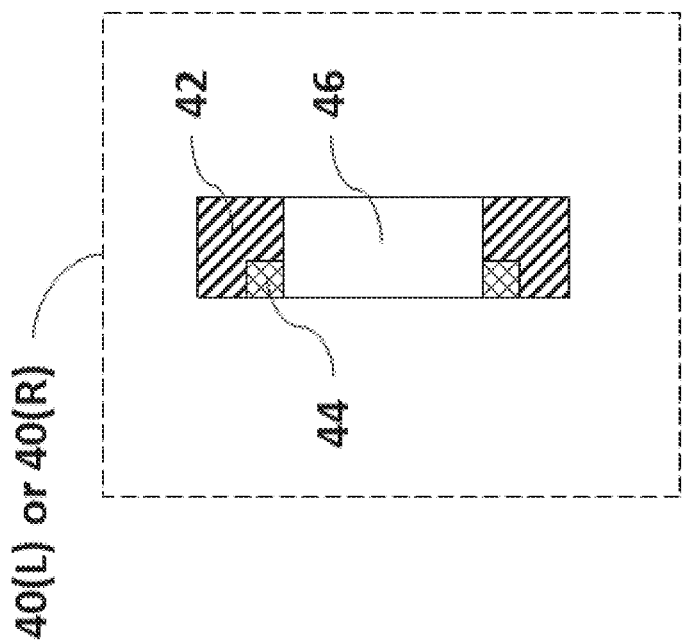
FIG. 4 shows a cross-sectional view of the prospective valve tube seal in FIG. 1.

FIG. 4 shows a cross-sectional view of the tube seals 40 of the electric coaxial valve 1 in FIG. 1, comprising a body 42, seal 44 and tube bore 46, where the material of the seal 44 is appropriate for the flow medium used.

Figure 5:
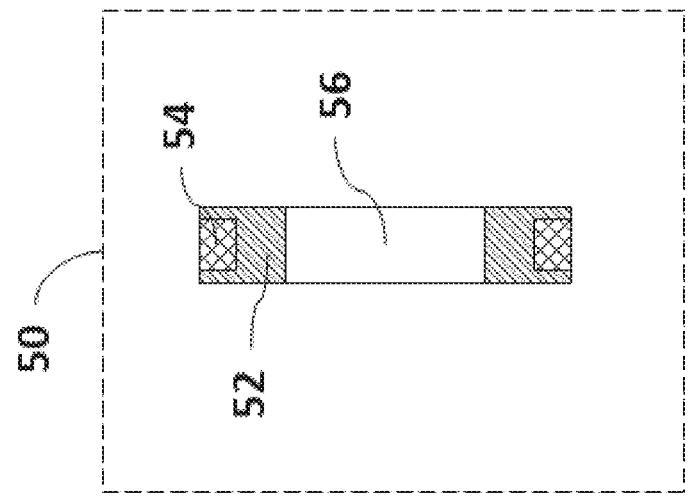
FIG. 5 shows a cross-sectional view of the prospective valve housing seal in FIG. 1.

FIG. 5 shows a cross-sectional view of the housing seal 50 of the electric coaxial valve 1 in FIG. 1, comprising a body 52, seal 54 and tube bore 56, where the material of the seal 54 is appropriate for the flow medium used.

Figure 6B:
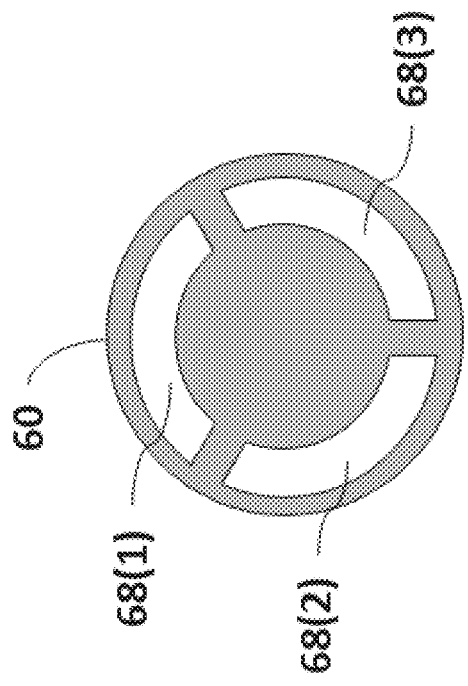
FIG. 6b shows the non-sealing side of the prospective valve seat in FIG. 6a to illustrate the segmented flow path.
Figure 6A:
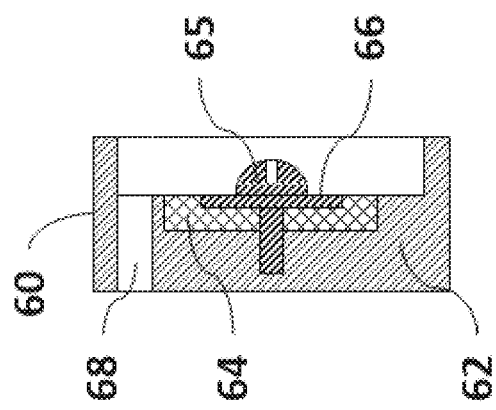
FIG. 6a shows a cross-sectional views of the prospective valve seat in FIG. 1.

FIG. 6 shows a cross-sectional view of the valve seat 60 of the electric coaxial valve 1 in FIG. 1, comprising a body 62 and seal 64, where the material of the seal 64 is appropriate for the gas or fluid used. In FIG. 6a, the seal 64 is held in place with a screw 65 and washer 66. It is understood that other holding methods could be utilized for holding the seal 64 and that the flow path 68 in FIG. 6a can be segmented as shown in FIG. 6b, for example flow paths 68(1-3).

In regard to the electric coaxial valve 1 in FIG. 1, and the respective parts in FIGS. 2-6 and given that the valve tube 30 is firmly abutted to the valve seat 60 closing off the flow of the medium into the valve tube 30 as shown in FIG. 1, operation of the electric coaxial valve 1 begins by applying a brief continuous or pulse current in a first direction to the coils 13(L-R) to cause the armature 10b and valve tube 30 to move in a first direction off the valve seat 60, opening the flow of the medium into the valve tube 30. Now given that the valve tube 30 is off the valve seat 60 allowing flow of the medium into the valve tube 30, by applying a brief continuous or pulse current in a second direction to the coils 13(L-R), causes the armature portion 10b and valve sleeve 30 to move in a second direction, to abut firmly against the valve seat 60 closing off the flow of the medium into the valve tube 30.

FIG. 7 shows an alternate version of the electric coaxial valve 1 of FIG. 1 for increased internal force and moving distance by the addition of the compression springs 70(L-R). The electric coaxial valve 1 in FIG. 7 has the member 80 modified from the force member 80 of FIG. 1 to accept the compression springs 70(L-R), but is still firmly attached to the armature 10b and the tube 30.

In FIG. 7, the armature 10b is magnetically latched to the left side of the stationary portion 10a with a first gap between the armature 10b and the right side of the stationary portion 10a, to compress the spring 70(L) and abutted the tube 30 to the valve seat 60, while the spring 70(R) is uncompressed. The opposite is true, so that, when the armature 10b is magnetically latched to the right side of the stationary portion 10a, the tube 30 would be off the valve seat 60 with a second gap between the armature 10b and the left side of the stationary portion 10a, while the spring 70(R) would be compressed and the spring 70(L) would be uncompressed.

It is understood that one of the compression springs 70(L) or 70(R) is pre-compressed during assembly.

It is further understood that the springs 70(L-R) provide a balanced spring means to provide additional force to reduce the energy required to operate the present invention by alternately releasing and exchanging the compression force between the springs 70(L-R) during the operation of the present invention.

In regard to the electric coaxial valve 1 in FIG. 7, and the respective parts in FIGS. 2-6 and given that the valve tube 30 is firmly abutted to the valve seat 60 closing off the flow of the medium into the valve tube 30 as shown in FIG. 7, and given spring 36(R) was pre-compressed during valve assembly, operation of the electric coaxial valve 1 begins by applying a brief continuous or pulse current in a first direction to the coils 13(L-R) to cause the armature 10b, force member 80, and valve tube 30 to move in a first direction, opening the flow of the medium into the valve tube 30. Whereby, the motion of the force member 80 compresses spring 36(R) while allowing spring 36(L) to expand, effectively transferring the stored energy in spring 36(L) to spring 36(R) while aiding in the release and motion of the armature 10b and valve tube 30 in the first direction. Now by applying a brief continuous or pulse current in a second direction to the coils 13(L-R), causes the armature 10b, force member 80, and valve sleeve 30 to move in a second direction, to abut the tube 30 firmly against the valve seat 60 closing the flow of the medium into the valve tube 30. Whereby, the motion of the force member 80 compresses spring 36(L) while allowing spring 36(R) to expand, effectively transferring the stored energy in spring 36(R) to spring 36(L) while aiding in the release and motion of the armature 10b and valve tube 30 in the second direction.

It is understood that the maximum compression force on the springs 36(L-R) is lower than the magnetic latching force of the armature portion 10b to the stationary portion 10a of the permanent electromagnet 10.

It is understood that the first and second gap between the armature 10b and the stationary portion 10a is the movement distance of the armature 10b and tube 30.

FIG. 8 shows a cross-sectional view of an alternate version of the force member 80 of FIG. 7 for ease in assembly. In FIG. 8, the force number 80 is divided into two portions, the force member portion 80a is firmly attached to the armature 10b and force member portion 80b is firmly attached to the tube 30. The function of the two-piece force member 80a-b remains the same as for the one-piece force member 80 of FIG. 7.

It is understood that the force member portion 80b could be an integral part of the armature 10b and the force member portion 80b could be an integral part of the tube 30.

It is further understood that the force m ember portions 80a-b will be abutted by the springs 70(L-R), but could be firmly abutted by other means appropriate during assembly.

FIG. 9 shows a cross-sectional view of one prospective means for allowing movement of the valve seat 60 of FIGS. 1 and 7 in the connection body 22a of FIG. 2 to lessen the need for accurate calibration of the movement distance, which is set by the first and second gap between the third and fourth poles 12(L-R) and the first and second poles 14(I-O) of FIG. 3. In FIG. 9, a flat spring 94 and force spacer 90 with a flow path 92 is used to allow the valve seat 60 and force spacer 90 to move axially by compressing the flat spring 94.

It is noted that even though the valve seat 60 will move away from the housing seal 50 in FIG. 1 or 7, under gas or fluid pressure, the housing seal 50 will be forced against the valve tube seal 40(L) for proper sealing when under static pressure from the flow medium.

It is understood that the flat spring 94 can be replace with coils springs, an elastomer (O-ring) or any other movement means that allows movement of the valve seat 60 to the degree needed to maintain the proper valve seat 60 to tube 30 sealing.

FIG. 10 shows a simple block diagram of a prospective pulse current means for operation of the present invention. A pulse current means is preferred over a brief continuous current means for providing the current to the present invention as a continuous current power supply would be much larger and less efficient than a pulse current power supply. The application of a pulsed current to the present invention also allows the invention through the pulse current means to be power versatile. A detailed description of a power versatile pulse current means can be found in U.S. Pat. No. 9,343,216 B2 by Robertson, where FIG. 10 is a partial schematic from the figures of U.S. Pat. No. 9,343,216 B2. It is understood that other pulse current means or current-to-coil methods can be used without taking away from the present invention. Other current-to-coil methods are discussed in U.S. Pat. No. 9,343,216 B2.

It is understood that the duration of the pulsed current need not be longer than the travel time of the valve tube 30 from a closed to open position or from a closed to open position.

In FIG. 10, the pulse current means is a control circuit composed of a power source, a capacitor, and switches, connected to the electromagnetic means represented by the dashed box or coils 13(L-R) in the armature 10b of FIG. 3. Operation of the pulse current means is as follows: the power switch is close, current from the power source then flows to the capacitor—indicated by the small arrow. Once the capacitor reaches the voltage needed to attain the required activation current through the coils 13(L-R), either switch-1 or switch-2 is closed to cause the first pulse current flow —indicated by the large arrow—to and through either coil 13(L) or 13(R), in reverse either switch-2 or switch-1 is closed to cause the second pulse current flow—indicated by the large arrow—to and through either coil 13(R) or 13(L).

It is understood that the power switch can be turned off after the capacitor reaches the voltage needed to attain the required activation current through the coils 13(L-R), where doing so, insures that the time that the current flows through either control coils 13(L-R) is controlled by the charge and voltage on the capacitor, which is typically in the tens of milli-seconds.

It is further understood that current can also flow to the coils 13(L-R), which can only store charge while the switches 1 and 2 are off.

What is claimed is:
1. An electric coaxial valve having increased magnetic force capability through the applicability of two poles, comprising in combination;
 a housing with an inlet and outlet for the flow of a medium;
 a first and a second pole piece to provide a magnetic force proportional to the two pole face areas;
 a third and a fourth pole piece rigidly connected to or integral with the housing and interposed centrally in the housing as determined by reference to the axis;

a valve seat integral with the housing and relatively proximal to a second gap and relatively distal from a first gap;

a tube for cooperating with the valve seat to alternatively prevent (close) or permit (open) the flow of the medium from the inlet to the outlet; the tube having first and second ends relatively proximal to the inlet and outlet of the housing, respectively;

an armature rigidly attached and circumscribing the exterior of the tube, defining a longitudinal axis thereof; the armature containing the first and second pole pieces and being interposed between the third and fourth pole pieces and spaced from the third and fourth pole piece as determined by reference to the axis such that the first gap is formed between the armature and the third pole piece, and the second gap is formed between the armature and the fourth pole piece;

a permanent magnet circumscribing the interior of the armature and being interposed centrally between the first and second pole pieces as determined by reference to the axis; the first and second pole pieces carries flux density attributable to the permanent magnet to the first and second gap where the magnetic flux from the first and second pole pieces is closed across the first gap by the third pole piece or across the second gap by the fourth pole piece to provide a magnetic force on the armature toward and against the third or fourth pole piece; where when the second gap is narrower than the first gap, the flux density attributable to the permanent magnet across the first and second pole pieces and toward the fourth pole piece is greater in the second gap than in the first gap; the second gap being further narrowed and the first gap correspondingly widened when the armature is thus subjected to the magnetic force originating from the magnet; where when the first gap is narrower than the second gap, the flux density attributable to the permanent magnet across the first and second pole pieces and toward the third pole piece is greater in the first gap than in the second gap; the first gap being further narrowed and the second gap correspondingly widened when the armature is thus subjected to the magnetic force originating from the magnet; where when the armature is abutted to the third or fourth pole piece the flux density attributable to the permanent magnet provides a magnetic latching force between the armature and the third or fourth pole piece greater than the magnetic force on the armature across the first or second gap;

an electromagnetic means circumscribing the interior of the armature and being interposed between the first and second pole pieces as determined by reference to the axis for cooperating with the permanent magnet to move the tube in response to a first current; the electromagnetic means having one or more coils wound, to receive a first current to increase flux density in the first gap and simultaneously decrease flux density in the second gap, and alternately, to receive a second current to increase flux density in the second gap and simultaneously decrease flux density in the first gap sufficiently;

wherein with the armature magnetically latched to the fourth pole piece, the electromagnetic means being operable by the first current to release the magnetic force on the armature; the armature moving away from the fourth pole piece and toward the third pole piece a distance which renders the first gap narrower than the second gap to magnetically latch the armature to the third pole piece while maintaining a clearance between the armature and the fourth pole piece; simultaneously the tube moving with the armature away from the valve seat to open the valve and permit flow;

wherein with the armature magnetically latched to the third pole piece, the electromagnetic means being operable by the second current to release the magnetic force on the armature; the armature moving away from the third pole piece and toward the fourth pole piece a distance which renders the second gap narrower than the first gap to magnetically latch the armature to the fourth pole piece while maintaining a clearance between the armature and the third pole piece; simultaneously the tube moving with the armature toward and into abutment with the valve seat to close the valve and stop flow.

2. The electric coaxial valve of claim 1, where a moving means for the valve seat is provided to allow the valve seat to adjust to the movement of the valve tube, while maintaining the blocking of the medium.

3. An electric coaxial valve powered by a pulse current means capable of providing a first and second current pulse to limit the amount of energy to the valve for energy efficiency, and an electric coaxial valve having increased magnetic force capability through the applicability of two poles, comprising in combination;

a housing with an inlet and outlet for the flow of a medium;

a first and a second pole piece to provide a magnetic force proportional to the two pole face areas;

a third and a fourth pole piece rigidly connected to or integral with the housing and interposed centrally in the housing as determined by reference to the axis;

a valve seat integral with the housing and relatively proximal to a second gap and relatively distal from a first gap;

a tube for cooperating with the valve seat to alternatively prevent (close) or permit (open) the flow of the medium from the inlet to the outlet of the housing; the tube having first and second ends relatively proximal to the inlet and outlet, respectively;

an armature rigidly attached and circumscribing the exterior of the tube, defining a longitudinal axis thereof; the armature containing the first and second pole pieces and being interposed between the third and fourth pole pieces and spaced from the third and fourth pole piece as determined by reference to the axis such that the first gap is formed between the armature and the third pole piece, and the second gap is formed between the armature and the fourth pole piece;

a permanent magnet circumscribing the interior of the armature and being interposed centrally between the first and second pole pieces as determined by reference to the axis; the first and second pole pieces carries flux density attributable to the permanent magnet to the first and second gap where the magnetic flux from the first and second pole pieces is closed across the first gap by the third pole piece or across the second gap by the fourth pole piece to provide a magnetic force on the armature toward and against the third or fourth pole piece; where when the second gap is narrower than the first gap, the flux density attributable to the permanent magnet across the first and second pole pieces and toward the fourth pole piece is greater in the second gap than in the first gap; the second gap being further narrowed and the first gap correspondingly widened when the armature is thus subjected to the magnetic force originating from the magnet; where when the first gap is narrower than the second gap, the flux density attributable to the permanent magnet across the first and second pole pieces and toward the third pole piece is greater in the first gap than in the second gap; the first gap being further narrowed and the second gap correspondingly widened when the armature is thus subjected to the magnetic force originating from the magnet; where when the armature is abutted to the third or fourth pole piece the flux density attributable to the permanent magnet provides a magnetic latching force between the armature and the third or fourth pole piece greater than the magnetic force on the armature across the first or second gap;

an electromagnetic means circumscribing the interior of the armature and being interposed between the first and second pole pieces as determined by reference to the axis for cooperating with the permanent magnet to move the tube in response to the pulse current means; the electromagnetic means having one or more coils wound, to receive the first current pulse to rapidly increase flux density in the first gap and simultaneously rapidly decrease flux density in the second gap sufficiently in a short period of time, and alternately, to receive the second current pulse to rapidly increase flux density in the second gap and simultaneously rapidly decrease flux density in the first gap sufficiently in a short period of time;

wherein with the armature magnetically latched to the fourth pole piece, the electromagnetic means being operable by the pulse current means with the first current pulse to release the magnetic force on the armature; the armature moving away from the fourth pole piece and toward the third pole piece a distance which renders the first gap narrower than the second gap to magnetically latch the armature to the third pole piece while maintaining a clearance between the armature and the fourth pole piece; simultaneously the tube moving with the armature away from the valve seat to open the valve and permit flow;

wherein with the armature magnetically latched to the third pole piece, the electromagnetic means being operable by the pulse current means with the second current pulse to release the magnetic force on the armature; the armature moving away from the third pole piece and toward the fourth pole piece a distance which renders the second gap narrower than the first gap to magnetically latch the armature to the fourth pole piece while maintaining a clearance between the armature and the third pole piece; simultaneously the tube moving with the armature toward and into abutment with the valve seat to close the valve and stop flow.

4. An electric coaxial valve as recited in claim 3, wherein the valve is made power versatile by using a bi-stable permanent magnet actuator system as the pulse current means.

5. The electric coaxial valve of claim 3, where a moving means for the valve seat is provided to allow the valve seat to adjust to the movement of the valve tube, while maintaining the blocking of the medium.

6. An electric coaxial valve, powered by a pulse current means capable of providing a first and second current pulse to limit the amount of energy to the valve for energy efficiency, having increased magnetic force capability through the applicability of two poles, and having increased internal force and movement distance capability provided by springs for additional energy efficiency, comprising in combination;

a housing with an inlet and outlet for the flow of a medium;

a first and a second pole piece to provide a magnetic force proportional to the two pole face areas;

a third and a fourth pole piece rigidly connected to or integral with the housing and interposed centrally in the housing as determined by reference to the axis;

a valve seat integral with the housing and relatively proximal to a second gap and relatively distal from a first gap;

a tube for cooperating with the valve seat to alternatively prevent (close) or permit (open) the flow of a medium from the inlet to the outlet; the tube having first and second ends relatively proximal to the inlet and outlet, respectively;

an armature defining a longitudinal axis thereof; the armature containing the first and second pole pieces and being interposed between the third and fourth pole pieces and spaced from the third and fourth pole piece as determined by reference to the axis such that the first gap is formed between the armature and the third pole piece, and the second gap is formed between the armature and the fourth pole piece;

a force member circumscribing the interior of the armature, circumscribing the exterior of the tube, and being rigidly connected to or integral with the armature and being rigidly connected to the tube, or being rigidly connected to or integral with the tube and being rigidly connected to the armature, to move in combination with the armature and the tube;

a permanent magnet circumscribing the interior of the armature and being interposed centrally between the first and second pole pieces as determined by reference to the axis; the first and second pole pieces carries flux density attributable to the permanent magnet to the first and second gap where the magnetic flux from the first and second pole pieces is closed across the first gap by the third pole piece or across the second gap by the fourth pole piece to provide a magnetic force on the armature toward and against the third or fourth pole piece; where when the second gap is narrower than the first gap, the flux density attributable to the permanent magnet across the first and second pole pieces and toward the fourth pole piece is greater in the second gap than in the first gap; the second gap being further narrowed and the first gap correspondingly widened when the armature is thus subjected to the magnetic force originating from the magnet; where when the first gap is narrower than the second gap, the flux density attributable to the permanent magnet across the first and second pole pieces and toward the third pole piece is greater in the first gap than in the second gap; the first gap being further narrowed and the second gap correspondingly widened when the armature is thus subjected to the magnetic force originating from the magnet; where when the armature is abutted to the third or fourth pole piece the flux density attributable to the permanent magnet provides a magnetic latching force between the armature and the third or fourth pole piece greater than the magnetic force on the armature across the first or second gap;

a balanced spring means comprising a first and second spring circumscribing the interior of the armature and circumscribing the exterior of the tube as determined by reference to the axis for cooperating with the armature to move the tube through use of the force member; the first spring being interposed between a second side of the housing and the force member corresponding to the first gap and the second spring being interposed between a first side of the housing and force member corresponding to the second gap; the first or second spring being compressed with a force during valve assembly that is smaller than the magnetic latching force provided by the permanent magnet but higher than the magnetic force provided by the permanent magnet across the first or second gap, and correspondingly the second or first spring being uncompressed during valve assembly; the compression force being alternately released and transferred between the first and second spring during valve operation;

an electromagnetic means circumscribing the interior of the armature and being interposed between the first and second pole pieces as determined by reference to the axis for cooperating with the permanent magnet and balanced spring means to move the tube through use of the force member in response to the pulse current means; the electromagnetic means having one or more coils wound, to receive the first current pulse to rapidly increase flux density in the first gap and simultaneously rapidly decrease flux density in the second gap sufficiently in a short period of time, and alternately, to receive the second current pulse to rapidly increase flux density in the second gap and simultaneously rapidly decrease flux density in the first gap sufficiently in a short period of time;

wherein with the armature magnetically latched to the fourth pole piece compressing the second spring, the electromagnetic means being operable by the pulse current means with the first current pulse to release the magnetic latching force between the armature and the fourth pole piece and the compression force in the second spring while simultaneously providing a magnetic force between the armature and the third pole piece that works in concert with the compression force from the second spring to move the armature away from the fourth pole piece and toward the third pole piece a distance which renders the first gap narrower than the second gap to abut the armature to the third pole piece while maintaining a clearance between the armature and the fourth pole piece; simultaneously the force member moves with the armature to compress the first spring and move the tube away from the valve seat to open the valve and permit flow of the medium;

wherein with the armature magnetically latched to the third pole piece compressing the first spring, the electromagnetic means being operable by the pulse current means by the second current pulse to release the magnetic latching force between the armature and the third pole piece and the compression force in the first spring while simultaneously providing a magnetic force between the armature and the fourth pole piece that works in concert with the compression force from the first spring to move the armature away from the third pole piece and toward the fourth pole piece a distance which renders the second gap narrower than the first gap to abut the armature to the fourth pole piece while maintaining a clearance between the armature and the third pole piece; simultaneously the force member moves with the armature to compress the first spring and move the tube toward and into abutment with the valve seat to close the valve and stop flow of the medium.

7. An electric coaxial valve as recited in claim 6, wherein the force member is in two portions, one portion being rigidly connected to or integral with the armature and one portion being rigidly connected to or integral with the tube, the two force member portions being abutted during valve assembly between the two spring to move in combination with the armature and the tube.

8. The electric coaxial valve of claim 6, where a moving means for the valve seat is provided to allow the valve seat to adjust to the movement of the valve tube, while maintaining the blocking of the medium.

9. An electric coaxial valve as recited in claim 6, wherein the valve is made power versatile by using a bi-stable permanent magnet actuator system as the pulse current means.

* * * * *